United States Patent
Reimelt

(10) Patent No.: US 6,619,117 B1
(45) Date of Patent: Sep. 16, 2003

(54) LEVEL MEASURING INSTRUMENT

(75) Inventor: Ralf Reimelt, Freiburg (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/659,016

(22) Filed: Sep. 8, 2000

(30) Foreign Application Priority Data

Sep. 11, 1999 (EP) .................................. 99118150

(51) Int. Cl.$^7$ ............................................. G01F 23/284
(52) U.S. Cl. ...................... 73/290; 73/290 R; 73/304 R
(58) Field of Search .................... 73/290 R, 304 R; G01F 23/284

(56) References Cited

U.S. PATENT DOCUMENTS

| | | | |
|---|---|---|---|
| 3,824,503 A | 7/1974 | McCracken | |
| 5,345,471 A | 9/1994 | McEwan | |
| 5,361,070 A | 11/1994 | McEwan | |
| 5,717,337 A | * 2/1998 | Kelly | .................. 324/533 |

FOREIGN PATENT DOCUMENTS

| | | |
|---|---|---|
| DE | 32 14487 | 10/1983 |
| DE | 94 21 870 | 3/1997 |
| EP | 780 664 | 6/1997 |
| EP | 780 665 | 6/1997 |
| EP | 875 738 | 11/1998 |
| WO | WO98/25109 | 6/1998 |

* cited by examiner

Primary Examiner—Daniel S. Larkin
Assistant Examiner—André K. Jackson
(74) Attorney, Agent, or Firm—Bose McKinney & Evans LLP

(57) ABSTRACT

Provision is made for a level measuring instrument for measuring a level of a filled material (1) in a container (3), in the case of which electromagnetic signals (S) generated by means of an electronic circuit (5) are guided into the container (3) via a waveguide (17) and signals (R) reflected at a filled material surface are guided out, in the case of which an impedance-matching device active in a frequency band of a bandwidth is connected upstream of the waveguide (17). For this purpose, the level measuring instrument comprises an injector (15, 15'),which transmits the signals (S) from the circuit (5) to the waveguide (17), and which has an inner conductor (19), which inner conductor (19) has, for the purpose of increasing the characteristic impedance, a conductor section (45, 45') with a geometry deviating from a cylindrical shape.

10 Claims, 2 Drawing Sheets

LEVEL MEASURING INSTRUMENT

The invention relates to the level measuring instrument for measuring a level of a filled material in a container, in the case of which an electronic circuit generates electromagnetic signals which are transmitted via an injector to a waveguide projecting into the container. Said waveguide guides the signals into the container and guides out signals reflected at a filled material surface. The reflected signals are fed to a receiving and evaluating circuit which determines the level therefrom.

In this case, the waveguide can be provided both by a single waveguide and by two or more waveguides which are arranged parallel to one another and extend downwards into the container from a point above the highest level to be measured. Suitable as waveguides are, for example, bare metal wires—also referred to as Sommerfeld waveguides—or metal wires provided with an insulation. The latter are also known under the designation of Goubau waveguides.

Level measuring instruments operating with electromagnetic signals can be used in a multiplicity of applications, both in storage and in the processing industry, for example in chemistry, in the food industry and in the oil industry.

DE-U 94 21 870 specifies a level measuring instrument for measuring a level of a filled material in a container and which comprises:
- an electronic circuit for generating electromagnetic signals,
- a waveguide projecting into the container,
    - which guides the signals into the container and guides out signals reflected at a filled material surface, and
- an injector,
    - which transmits the signals from the circuit to the waveguide, and
    - which has an inner conductor.

An electronic circuit for generating the electromagnetic signals, and receiving and evaluating circuits are described, for example, in EP-A 780 665.

In the case of the level measuring instrument in accordance with DE-U 94 21 870, the signals are short electromagnetic pulses which are reflected at the surface of the filled material. The injector is a coaxial bushing with an inner conductor and an outer conductor. A first side of the bushing is connected to the electronic circuit via a coaxial line. The inner conductor merges into the waveguide on an opposite, second side of the injector.

The characteristic impedance of the coaxial line is usually 50 Ω, that of the waveguide is a function of frequency and is, for example, a few 100 Ω.

At the transition from the pure coaxial conductor to the waveguide, a funnel coaxially embracing the waveguide is therefore integrally formed on the outer conductor in the case of the level measuring instrument in accordance with DE-U 94 21 870. Said funnel serves the purpose of avoiding impedance discontinuities and reflections in the region of the transition.

The funnel can serve the purpose not only of impedance matching, but also of improving the matching of the propagation modes.

The dimensions of a funnel are to be selected as a function of the wavelength of the electromagnetic signals. The larger the wavelength, the larger also must the funnel be constructed so that it achieves the desired matching of impedance and/or modes. However, short electromagnetic pulses regularly have not only one frequency but a frequency spectrum with a bandwidth. The spectrum is bounded below, for example by a direct component with 0 Hz. The upper bound depends on the type of pulse generation. In the case of a frequency spectrum from, for example, 0 Hz up to 1.5 GHz, the shortest occurring wavelengths are at approximately 0.2 m. There is no upper bound for wavelengths which occur. The funnel can be designed only for one of the frequencies occurring. Since a very large proportion of the energy in the case of a pulse is contained in signal components of low frequency, the funnel would have to be very large in order to offer adequate impedance matching at least for these components. If the funnel is large enough for the low frequencies, it is also suitable for higher frequencies.

Even a large funnel does not offer optimum matching, and it requires a great deal of space. However, this space is frequently not available, for example when there is only a small opening in the container for the level measuring instrument. These level measuring instruments are therefore regularly used without funnels.

It is an object of the invention to specify a level measuring instrument for measuring a level of a filled material in a container, in the case of which electromagnetic signals generated by means of an electronic circuit are guided into the container via a waveguide and signals reflected at a filled material surface are guided out, in the case of which an impedance-matching device active in a frequency band of a bandwidth is connected upstream of the waveguide.

For this purpose, the invention consists in a level measuring instrument for measuring a level of a filled material in a container, which comprises:
- an electronic circuit for generating electromagnetic signals,
- a waveguide projecting into the container,
    - which guides the signals into the container and guides out signals reflected at a filled material surface, and
- an injector,
    - which transmits the signals from the circuit to the waveguide, and
    - which has an inner conductor,
        - which inner conductor has, for the purpose of increasing the characteristic impedance, a conductor section with a geometry deviating from a cylindrical shape.

In accordance with a development of the invention, the conductor section is a helical conductor.

In accordance with a refinement, the number of turns which the helical conductor has per unit length increases in the direction facing the waveguide.

In accordance with a refinement, the helical waveguide has a mean number of turns per unit length which is selected such that the characteristic impedance of the injector in the region of the conductor section is approximately equal to the square root of a product of the output characteristic impedance of the electronic circuit and the characteristic impedance of the waveguide.

In accordance with a refinement, the injector is a coaxial bushing with an inner conductor and an outer conductor, which has a first side connected to the electronic circuit via a coaxial line, and which has a second side at which the inner conductor merges into the waveguide.

In accordance with a refinement, the injector serves the purpose of mechanically fastening the level measuring instrument at a measuring place, and of fastening the waveguide.

In accordance with a refinement, the level measuring instrument has a receiving and evaluating circuit which receives the reflected signals and determines the level therefrom.

The invention and its advantages are now explained in more detail with the aid of the figures of the drawing, in which two exemplary embodiments are illustrated; in the figures, identical elements are provided with the same reference numerals.

Figure 1:
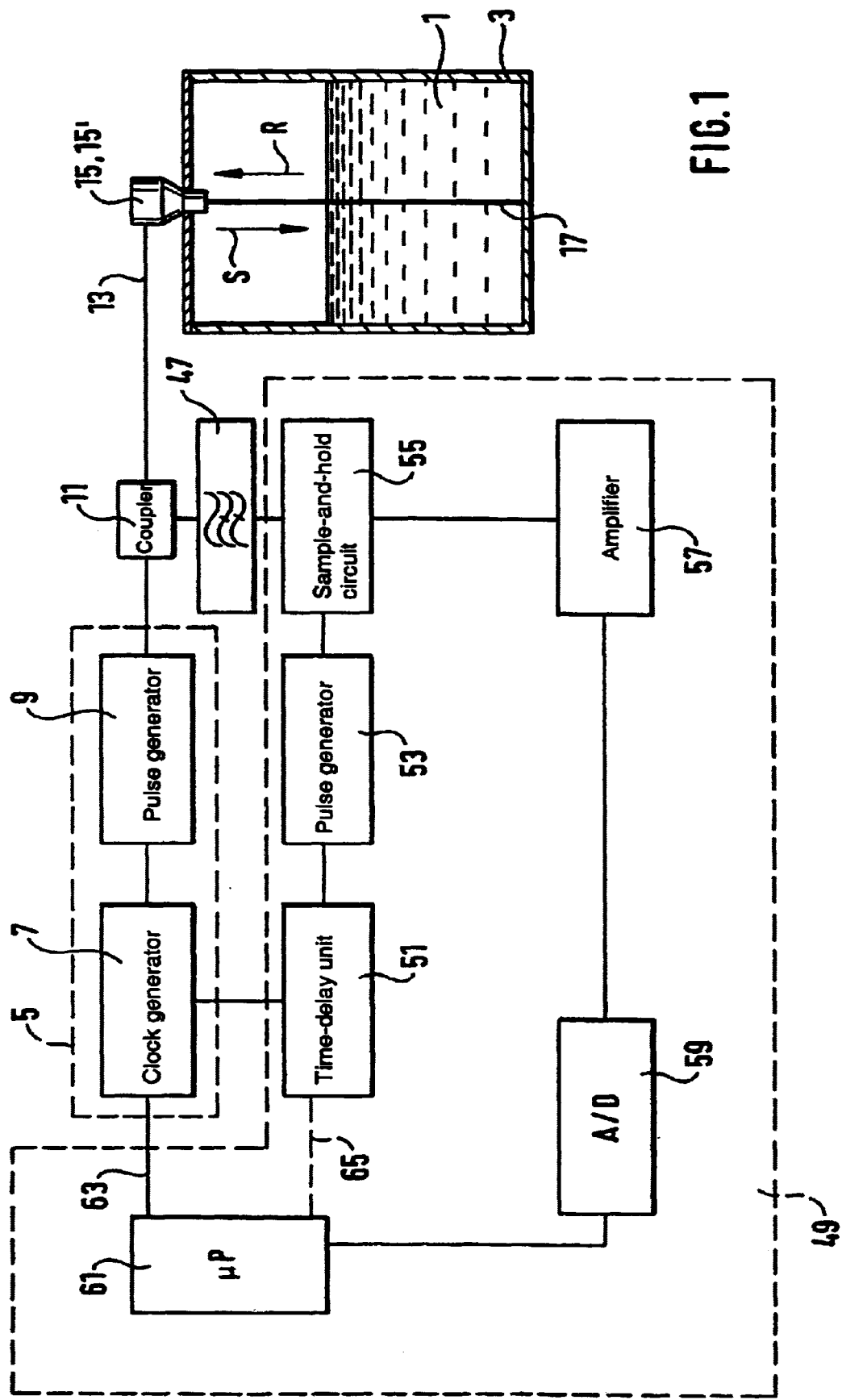
FIG. 1 shows a schematic of a level measuring instrument, a circuit for generating electromagnetic signals and a receiving and evaluating circuit.

FIG. 1 shows a schematic of a level measuring instrument. It serves to measure a level of a filled material 1 in a container 3, and has an electronic circuit 5 for generating electromagnetic signals S. In the case of the exemplary embodiment illustrated, the electronic circuit 5 has a transmitting clock generator 7 and a transmitting pulse generator 9. A transmitted clock pulse of the transmitting clock generator 7 is fed to the transmitting pulse generator 9. It is preferable to use a transmitting pulse generator 9 which generates electromagnetic signals which are in the form of low-energy radio-frequency short pulses. Such transmitting pulse generators, and electronic circuits and receiving and evaluating circuits which can be used in conjunction therewith, are described, for example, in U.S. Pat. No. 5,345,471 and U.S. Pat. No. 5,361,070. Pulses with a peak power of less than 1 $\mu$W and a useful power of 1 nW or less can be generated with frequencies of 100 MHz and more. The transmitted clock-pulse rate is, for example, a few MHz.

The electromagnetic signals S are fed to an injector 15 during operation by means of a coaxial line 13 via a directional coupler 11.

The injector 15 transmits the electromagnetic signals S to a waveguide 17 projecting into the container 3. Said waveguide leads the signals S into the container 3 and leads out signals R reflected at a filled material surface.

The waveguide 17 is, for example, a mechanically rigid rod or a mechanically rigid wire. However, it is equally possible to use a tensioned cable of which, one end is fastened on injector 15 and the other end is fastened on a bottom of the container 3. Instead of fastening the other end on the container bottom, it is also possible to fasten on the other end a weight by means of which the cable is tensioned. It is possible to use both bare rods, wires or cables made from metal, for example from a high-grade steel, and metal wires, rods or cables provided with an insulation. Polytetrafluoroethylene (PTFE), for example, is suitable as insulator.

As illustrated purely schematically in FIG. 1, the injector 15 is mounted in an opening of the container 3.

Figure 2:
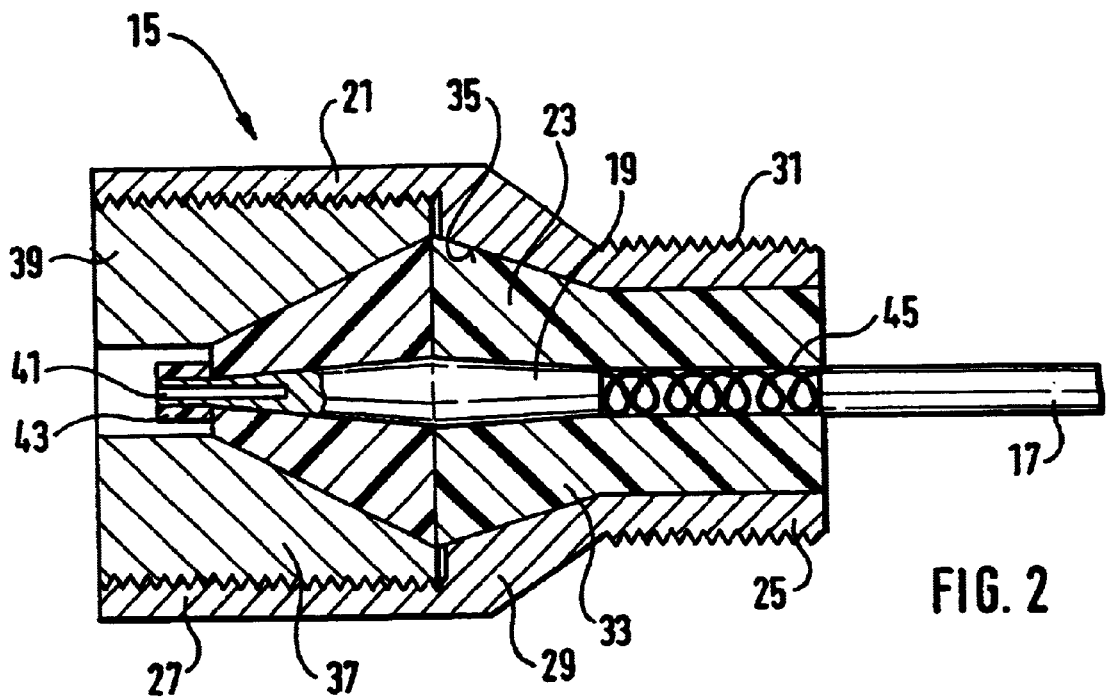
FIG. 2 shows a schematic of an injector having a helical conductor with a constant number of turns per unit length.

FIG. 2 shows an exemplary embodiment of an injector 15. The injector 15 is a coaxial bushing with an inner conductor 19 and an outer conductor 21. The cavity remaining between the inner conductor 19 and the outer conductor 21 is filled up by an insert 23 made from a dielectric.

The outer conductor 21 has an outer element which comprises two hollow cylindrical sections 25, 27 which are interconnected by a conical tube length 29. The hollow cylindrical section 25 with the smaller diameter faces a container interior in the installed state.

In the case of the exemplary embodiment shown, the injector 15 also serves the purpose of mechanically fastening the level measuring instrument at a measuring place. Integrally formed for this purpose on the hollow cylindrical section 25 is an external thread 31 by means of which the injector 15 can be screwed into an internal thread arranged in the opening of the container 3. Alternatively, the injector 15 can have a flange which can be fastened on a mating flange surrounding the opening. Other types of fastening known to the person skilled in the art can likewise be used.

The insert 23 has a first segment 33 which fills up the interior of the hollow cylindrical section 25 and of the conical tube length 29. The first segment 33 has a continuous bore for holding the inner conductor 19. At an end averted from the container, the bore has a section in which the diameter increases in the direction averted from the container, such that there is a conical inner lateral surface 35 at the end. The inner conductor 19 has a congruent conical outer lateral surface which rests on the conical inner lateral surface 35 of the insert 23.

Adjoining the section of the inner conductor 19, whose diameter increases in the direction averted from the container, in the direction averted from the container is a section whose diameter decreases in the direction averted from the container. The second segment 37 of the insert 23 is mounted on the latter section. The second segment 37 is in the shape of a conical frustum and has a continuous bore whose diameter decreases in the direction averted from the container, such that the second segment 37 bears tightly against that section of the inner conductor 19 which is enclosed therein.

The outer conductor 21 has an inner element 39 which is screwed into the cylindrical section 27 of the outer element by means of an outer thread integrally formed thereon. It has an axial bore which is adjoined in the direction facing the container by a cutout for holding the second segment 37, in the shape of a conical frustum, of the insert 23.

At its end averted from the container, the inner conductor 19 has an axial blind bore 41, and it is surrounded at the end by an annular cylinder 43 made from a dielectric. The annular cylinder 43 adjoins the insert 23. There is an annular cylindrical gap between the annular cylinder 43 and the inner element 39 of the outer conductor 21. This shaping permits the coaxial line 13 to be collected to this first side of the injector 15 by means of a commercial connector (not illustrated in FIG. 2). The inner conductor 19 merges into the waveguide 17 on an opposite, second side of the injector 15. The inner conductor 19 and wavelength 17 can be a single component.

The two conical lateral surfaces of the inner conductor 19 clamp the inner conductor 19 in the insert 23. Similarly, the two conical outer lateral surfaces of the insert 23 clamp the insert 23 in the outer conductor 21. Since the waveguide 17 is permanently connected to the inner conductor 17, the injector 15 therefore also serves the purpose of fastening the waveguide 17 mechanically.

The coaxial conductor 13 usually has a characteristic impedance of 50 $\Omega$, and forms the output characteristic impedance of the electronic circuit 5. The characteristic impedance of the waveguide 17, by contrast, has values of a few 100 $\Omega$. Without a suitable impedance matching, a larger proportion of the signals would be reflected at this transition, and only a smaller proportion of the signal power would be useful for the level measurement. Impedance matching requires that the characteristic impedance in the region of the injector 15 is greater than the output characteristic impedance of the electronic circuit 5 and smaller than that of the waveguide 17.

It would be conceivable to increase the characteristic impedance by enlarging the diameter. However, this is unsuitable, since the space available at the measuring place is limited in most applications. A reduction in the diameter of the inner conductor 19 is, as a rule, excluded for reasons of mechanical stability. In the case of an outer conductor diameter of a few centimeters, the inner conductor 19 would need to have a diameter of significantly less than a millimeter for there to be a characteristic impedance of the order of magnitude or 150 Ω.

According to the invention, the impedance matching is achieved by virtue of the fact that the inner conductor 19 has a conductor section 45 which is arranged in the interior of the injector 15 and has a geometry deviating from a cylindrical shape in order to increase the characteristic impedance. In principle, any deviation from the cylindrical shape effects an increase in the characteristic impedance. It is thus conceivable, for example, to design the conductor section 45 with notches or annular circumferential grooves. These cutouts reduce the capacitance per unit length. This shaping increases the characteristic impedance without thereby enlarging the outside diameter of the injector 15. The mechanical stability of the inner conductor 19 also remains essentially unchanged.

As illustrated in FIG. 2, the conductor section 45 is preferably a helical conductor. In the case of a helical conductor, the propagation of the signals proceeds virtually undisturbed, while in the case of the insertion of capacitive elements parasitic effects caused by geometry could occur. In order to avoid the reduction of higher modes as completely as possible, the spacing of two consecutive turns is preferably small compared to the wavelength of the desired modes.

A further advantage of the helical conductor is that virtually no dispersion occurs. The signals fed in retain their shape.

The characteristic impedance Z of a coaxial conductor in the case of which the inner conductor is a helical conductor is determined by the following equation:

$$Z = 60 \Omega \ln(D/d) \left[ 1 + \frac{(n\pi d)^2}{2\ln(D/d)} (1 - (d/D)^2) \right]^{1/2}$$

D being an inside diameter of the outer conductor of the coaxial conductor, d being an outside diameter of the helical conductor, and n being a number of turns per unit length.

The inside diameter D of the outer conductor of the coaxial conductor, and the outside diameter d of the helical conductor can, as a rule, be selected only to a very limited degree owing to the diameter of the container opening and to the stipulation of the minimum capacity of the inner conductor 19 to be loaded by tension and compression. By contrast, the number of turns per unit length n makes available for the first time a manipulated variable which can be freely selected for the purpose of matching the characteristic impedance Z.

Figure 3:
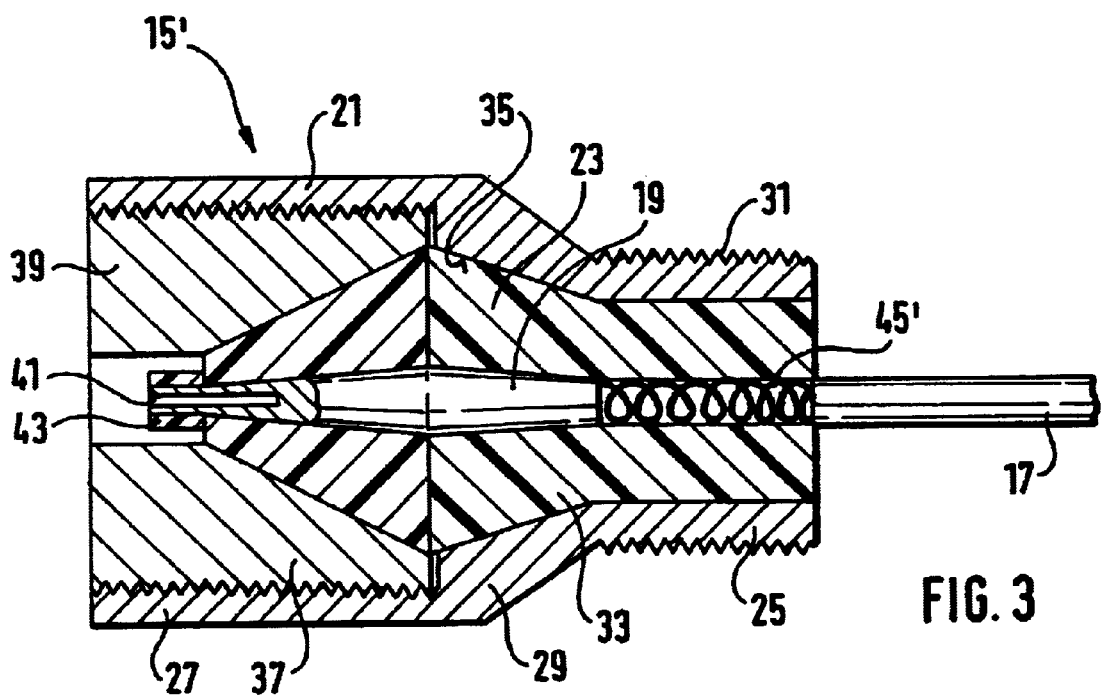
FIG. 3 shows a schematic of an injector having a helical conductor in the case of which the number of turns per unit length varies.

Illustrated in FIG. 3 as a further injector 15', which differs from that illustrated in FIG. 2 only in the construction of the helical conductor.

In the case of the exemplary embodiment illustrated in FIG. 2, the number of turns per unit length n of the waveguide is constant to the entire length of the conductor section 45. In the case of the exemplary embodiment illustrated in FIG. 3, the number of turns per unit length n' of the conductor section 45' increases in the direction facing the waveguide. It is possible thereby to implement a continuous rise in the characteristic impedance from the coaxial line 13 to the helical conductor 17.

In the case of both exemplary embodiments, a mean number of turns per unit length is preferably selected such that the characteristic impedance of the injector 15, 15' in the region of the conductor section 45, 45' is roughly equal to the square root of a product of the output characteristic impedance of the electronic circuit 5 and the characteristic impedance of the waveguide 17. For the exemplary embodiments shown, the output impedance of the electronic circuit 5 in each case corresponds to the characteristic impedance of the coaxial line 13.

Because of the geometry, deviating from the cylindrical shape, of the conductor section 45, 45', an impedance matching is thus implemented as a result of which substantially smaller input reflections occur at the transition from the coaxial conductor 13 to the waveguide 17, without the diameter of the injector 15, 15' being enlarged of the diameter of the inner conductor 19 being reduced. It is possible, thereby to implement very stable and compact level measuring instruments.

The reduction of the input reflections has a positive effect in the case both of the reduction of the signals S and of the reception of the signals R reflected at the filled material surface. Investigations have shown that the amplitude of a signal R reflected at the filled material surface can be virtually doubled by the construction, according to the invention, of the conductor section of the inner conductor 19. It is therefore possible to detect levels of media with a very low dielectric constant, and/or longer waveguides 17 can be used.

As a result of the impedance matching according to the invention, not only do reflections originating from the injector have a smaller amplitude, but the time interval in which signals originating from reflections in the region of the injector reach the receiving and evaluating circuit 49 becomes narrower since, in particular, multiple reflections occur much more seldom. No level measurement is possible in the abovenamed time interval, since the reflection produced by the filled material surface cannot be distinguished from a reflection inside the injector 15, 15'. Shortening this time interval therefore enlarges the measuring range.

A signal R reflected at the filled material surface is fed via the waveguide 17, the injector 15, the directional coupler 11 and a high-pass filter 47 to a receiving and evaluating circuit 49 which receives said signal, determines a propagation time of the electromagnetic signal S from the electronic circuit 5 to the filled material surface, and of the reflected signal R from the filled material surface to the receiving and evaluating circuit 49, and determines the level therefrom.

The propagation rate of the electromagnetic signals, and the spacings between the electronic circuit 5 and the container bottom and between the receiving and evaluating circuit 49 and the container bottom are known in any case, or can be obtained by simple reference measurements. Using these data, the measured propagation time yields the height of the level.

FIG. 1 shows an exemplary embodiment of a block diagram of the receiving and evaluating circuit 49. The electronic circuit 5 and the receiving and evaluating circuit 49 are preferably accommodated in a housing (not illustrated in FIG. 1) connected to the injector 9.

The electromagnetic signals are fed to the waveguide 17 via the injector 15, 15'. Conversely, signals R reflected along the waveguide 17 reach the receiving and evaluating circuit 49 via the waveguide 7, the injector 15, 15', the directional coupler 11 and the high-pass filter 47 connected downstream of the directional coupler 11.

The receiving and evaluating circuit 49 comprises a time-delay unit 51, at the input of which the transmitted clock pulse of the transmitting clock generator 7 is present and which generates a sampling clock pulse which corresponds to the transmitted clock pulse delayed by a variable delay time. The variable time delay is provided, for example, by a means of a saw-tooth voltage generator. The sampling clock pulse is fed to a sampling pulse generator 53 which generates sampling pulses as a function of the sampling clock pulse and feeds them to a first input of a sample-and-hold circuit 55. The sampling and transmitting pulse generators 9, 53 are preferably identical, with the result that the electromagnetic signals they generate differ merely by the variable delay time.

The reflected signals R are present, via the directional coupler 11 and the high-pass filter 47, at a second input of the sample-and-hold circuit 55.

In operation, short transmitted pulses are generated preferably periodically at the transmitted clock pulse frequency, and the reflected echo signals are fed to the sample-and-hold circuit 55. A sampling pulse is superposed there on each echo signal, and a total signal resulting therefrom is picked up, amplified by is means of a downstream amplifier 57, digitized using an analogue-to-digital converter 59 arranged in series with the amplifier 57, and fed to a microprocessor 61 as a sample.

The total signal is a measure of the agreement between the echo signal and sampling pulse. The echo signals arrive periodically and successive sampling pulses differ from one another in the time delay, running in accordance with the saw-tooth function. Assuming that successive echo signals do not differ substantially from one another, the sample-and-hold circuit 55 supplies a stroboscopic recording of the echo signals. This assumption is typically always fulfilled, since the level is virtually without change in the period of time between two transmitted pulses.

The microprocessor 61 is connected to the transmitting clock pulse generator 53 via a first line 63, and to the sampling clock pulse generator 53 via a second line 65. In operation, the microprocessor 61 regularly starts measuring cycles. During a measuring cycle, the electromagnetic signals are periodically generated, as previously described, and the reflected signals R are sampled. A measuring cycle ends when all the time delays, provided in accordance with the saw-tooth function, have elapsed. The individual samples are respectively recorded in conjunction with the assigned instantaneous delay. This yields a measurement signal characteristic from which the propagation time can be determined.

What is claimed is:

1. A level measuring instrument for measuring a level of a filled material in a container, which comprises:
   an electronic circuit for generating electromagnetic signals,
   a waveguide projecting into the container, which guides the signals into the container and guides out signals reflected at a filled material surface,
   an injector,
   which transmits the signals from the circuit to the waveguide,
   which has an inner conductor,
   which inner conductor has, for the purpose of increasing the characteristic impedance, a helical conductor, and
   which the number of turns which the electrical conductor has per unit length increases in the direction facing the waveguide.

2. The level measuring instrument as claimed in claim 1, in the case of which the helical conductor has a mean number of turns per unit length which is selected such that the characteristic impedance of the injector in the region of the conductor section is approximately equal to the square root of a product of the output characteristic impedance of the electronic circuit and the characteristic impedance of the waveguide.

3. The level measuring instrument as claimed in claim 1, in the case of which the injector is a coaxial bushing with an inner conductor and an outer conductor, which has a first side connected to the electronic circuit via a coaxial line, and which has a second side at which the inner conductor merges into the waveguide.

4. The level measuring instrument as claimed in claim 1, which has a receiving and evaluating circuit which receives reflected signals and determines the level therefrom.

5. A level measuring instrument for measuring a level of a filled material in a container, which comprises:
   an electronic circuit for generating electromagnetic signals,
   a waveguide projecting into the container, which guides the signals into the container and guides out signals reflected at a filled material surface,
   an injector,
   which transmits the signals from the circuit to the waveguide,
   which is a coaxial bushing with an inner conductor and an outer conductor,
   which inner conductor has, for the purpose of increasing the characteristic impedance, a conductor section with a geometry deviating from a cylindrical shape,
   which injector has a first side connected to the electronic circuit via a coaxial line,
   which injector has a second side at which the inner conductor merges into the waveguide, and wherein
   the injector serves the purpose of mechanically fastening the level measuring instrument at a measuring place, and of fastening the waveguide.

6. A level measuring instrument for measuring a level of a filled material in a container, the level measuring instrument comprising:
   an electronic circuit configured to generate electromagnetic signals,
   a waveguide configured to project into the container, the waveguide being configured to guide the electromagnetic signals into the container and to guide electromagnetic signals reflected at a surface of the filled material out of the container, and
   an injector coupled to the electronic circuit and the waveguide, the injector being configured to transmit the electromagnetic signals from the electronic circuit to the waveguide, the injector including an inner conductor having a helical conductor,
   wherein the helical conductor has a number of turns per unit length which increases in a direction facing the waveguide.

7. The level measuring instrument as claimed in claim 6, wherein the helical conductor has a mean number of turns per unit length which is selected such that a characteristic impedance of the injector in the region of the conductor section is approximately equal to the square root of a product of an output characteristic impedance of the electronic circuit and a characteristic impedance of the waveguide.

8. The level measuring instrument as claimed in claim 6, wherein the injector is a coaxial bushing including an inner conductor and an outer conductor, the coaxial bushing having a first side connected to the electronic circuit via a coaxial line, and a second side at which the inner conductor merges into the waveguide.

9. The level measuring device as claimed in claim 8, wherein the injector is configured to fasten the level measuring instrument at a measuring place on the container and to fasten the waveguide to the injector.

10. The level measuring instrument as claimed in claim 6, further comprising a receiving and evaluating circuit configured to receive reflected signals and to determine the level of the filled material.

* * * * *